United States Patent
Chen (10) Patent No.: US 9,025,616 B2
(45) Date of Patent: May 5, 2015

(54) WAVELENGTH MULTIPLEXER/DEMULTIPLEXER APPARATUS

(71) Applicant: Alcatel-Lucent USA Inc., Murray Hill, NJ (US)

(72) Inventor: Long Chen, Holmdel, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 63 days.

(21) Appl. No.: 13/828,739

(22) Filed: Mar. 14, 2013

(65) Prior Publication Data

US 2013/0250977 A1 Sep. 26, 2013

Related U.S. Application Data

(60) Provisional application No. 61/613,686, filed on Mar. 21, 2012.

(51) Int. Cl.
*H04J 14/02* (2006.01)

(52) U.S. Cl.
CPC ........... *H04J 14/0221* (2013.01); *H04J 14/021* (2013.01); *H04J 14/0212* (2013.01); *H04J 14/0227* (2013.01); *H04J 14/0267* (2013.01)

(58) Field of Classification Search
None
See application file for complete search history.

(56) References Cited

U.S. PATENT DOCUMENTS

| | | | |
|---|---|---|---|
| 6,512,612 B1 * | 1/2003 | Fatehi et al. | 398/49 |
| 6,570,872 B1 * | 5/2003 | Beshai et al. | 370/369 |
| 2003/0189938 A1 * | 10/2003 | Beshai | 370/396 |
| 2003/0193937 A1 * | 10/2003 | Beshai et al. | 370/372 |
| 2004/0207894 A1 * | 10/2004 | Hodges et al. | 359/212 |
| 2004/0218855 A1 * | 11/2004 | Markwardt et al. | 385/24 |
| 2005/0002603 A9 * | 1/2005 | Beshai et al. | 385/24 |
| 2005/0018957 A1 * | 1/2005 | Aksyuk et al. | 385/18 |
| 2006/0098981 A1 * | 5/2006 | Miura et al. | 398/45 |
| 2011/0052191 A1 * | 3/2011 | Beshai | 398/52 |

* cited by examiner

*Primary Examiner* — Kerri Rose
(74) *Attorney, Agent, or Firm* — Hitt Gaines, PC

(57) ABSTRACT

An apparatus comprising an optical multiplexer/demultiplexer having a set of input ports and a set of output ports, the optical multiplexer/demultiplexer configured to demultiplex a wavelength division multiplexed optical signal to one port of the set of input ports, and to output a plurality of demultiplexed wavelength channels to one of a plurality of subsets of output ports within the set of output ports. The apparatus comprises an optical switch configured to route the wavelength division multiplexed signal to a selected one of the input ports, thereby causing the plurality of demultiplexed wavelength channels to be output by the optical multiplexer/demultiplexer to selected ones of the plurality of subsets of output ports.

19 Claims, 6 Drawing Sheets

WAVELENGTH MULTIPLEXER/DEMULTIPLEXER APPARATUS

CROSS REFERENCE TO RELATED APPLICATIONS

This application claims the benefit of U.S. Provisional Application Ser. No. 61/613,686 filed on Mar. 21, 2012, to Chen, entitled, "FABRICATION-TOLERANT WAVELENGTH MULTIPLEXER/DEMULTIPLEXER," which is incorporated herein by reference in its entirety.

TECHNICAL FIELD

This application is directed, in general, to optical communications apparatuses, systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Photonic integrated circuits based on high-index-contrast waveguides such as silicon, silicon-nitride, or InP have great potential in optical communications systems because of, e.g. potential reduction of size, power, and cost of such devices relative to solutions using lower index-contrast waveguide. However, one challenge associated with using such circuits in production wavelength-division multiplexed (WDM) systems is the wavelength accuracy of the fabricated circuits, e.g., whether the wavelength channels of a multiplexer and demultiplexer are aligned with the laser wavelengths of the multiplexed channels, e.g. the grid of the WDM system. For example, for a WDM system with 100 GHz spacing, the multiplexer/demultiplexer (mux/demux) channels typically need to be aligned to the grids with an accuracy of about +/−10 GHz. On the contrary, a mux/demux based on thin silicon waveguides typically have a wavelength variation of as large as 1000 GHz even on the same wafer, e.g. orders of magnitude higher than the desired grid alignment accuracy. Unfortunately, this variation is thought to be fundamental to currently known fabrication methods. For example, to achieve 10 GHz wavelength accuracy on thin silicon waveguides, the precision of the waveguide dimension (e.g. width) may need to be as small as 1 nm over the length of the waveguide, which is beyond the best known manufacturing capability. Although thermo-optical tuning can be used to shift the mux/demux channel positions, the magnitude of the possible adjustment is typically limited. For example, to obtain 1000 GHz tuning range of a thin-waveguide mux/demux, the waveguide temperature may need to be changed by as much as 100° C. for silicon waveguides, and as much as several hundred ° C. for devices based on silicon nitride. Such large changes are impractical due to, e.g. power consumption and resulting device reliability issues.

SUMMARY OF ILLUSTRATIVE EMBODIMENTS

One embodiment is an apparatus. The apparatus comprises an optical multiplexer/demultiplexer having a set of input ports and a set of output ports, the optical multiplexer/demultiplexer configured to demultiplex a wavelength division multiplexed optical signal to one port of the set of input ports, and to output a plurality of demultiplexed wavelength channels to one of a plurality of subsets of output ports within the set of output ports. The apparatus comprises an optical switch configured to route the wavelength division multiplexed signal to a selected one of the input ports, thereby causing the plurality of demultiplexed wavelength channels to be output by the optical multiplexer/demultiplexer to selected ones of the plurality of subsets of output ports.

In some such embodiments the optical switch can be configured as an optical space switch having an input switch port and a plurality of output switch ports. The input switch port can be configured to receive the wavelength division multiplexed optical signal. The plurality of output switch ports are configured to transmit the wavelength division multiplexed optical signal to one of the set of the input ports of the optical multiplexer/demultiplexer. In some such embodiments the optical switch includes movable optical elements configured to controllably direct the wavelength division multiplexed optical signal from the input switch port to one of the output switch ports. In some such embodiments the optical switch includes one or more Mach Zhender interferometers configured to controllably direct the wavelength division multiplexed optical signal from the input switch port to one of the output switch ports.

Some embodiments of the apparatus further include a control module configured to control the routing of the wavelength division multiplexed input signal to the selected one of the input ports of the optical multiplexer/demultiplexer. In some such embodiments, the control module can be configured to send one or more control signals to the optical switch to thereby cause the optical switch to successively send the wavelength division multiplexed optical signal from the input switch port to each one of the plurality of output switch ports. In some such embodiments, the control module can be configured to adjust the routing of the wavelength division multiplexed signal to the selected one of the input ports that increases the optical power level output of the demultiplexed wavelength channels from the optical multiplexer/demultiplexer. In some such embodiments, the control module is configured to route the wavelength division multiplexed signal in response to temperature-induced shifts in optical passbands of the optical multiplexer/demultiplexer.

Some embodiments of the optical multiplexer/demultiplexer include a grating configured to separate the wavelength division multiplexed optical signal into separated wavelength channels and send the separated wavelength channels to selected ones of the set of output ports.

In some embodiments of the apparatus the optical multiplexer/demultiplexer is configured to multiplex the plurality of demultiplexed wavelength channels to one of the plurality of subsets of output ports within the set of output ports and to output the wavelength division multiplexed optical signal to one port of the set of input ports. In some such embodiments, the optical switch is configured to route the wavelength division multiplexed signal from the one port of the set input ports of the optical multiplexer/demultiplexer, thereby causing the wavelength division multiplexed signal to be output by a single switch port of the optical switch.

Some embodiment of the apparatus further include a temperature control device configured to change the temperature of the optical multiplexer/demultiplexer to thereby alter optical path-lengths in the optical multiplexer/demultiplexer, In some embodiments, the optical switch is configured to provide a coarse adjustment of the optical passbands of the multiplexer/demultiplexer and the temperature control device is configured to provide a fine adjustment of the optical passbands of the multiplexer/demultiplexer.

Another embodiment is a system that comprises a tunable optical multiplexer/demultiplexer apparatus. The apparatus includes an optical multiplexer/demultiplexer having a set of input ports and a set of output ports. The optical multiplexer/demultiplexer can be configured to demultiplex a wavelength division multiplexed optical signal to one port of the set of input ports, and to output a plurality of demultiplexed wavelength channels to one of a plurality of subsets of output ports within the set of output ports. The apparatus also includes an optical switch that can be configured to route the wavelength division multiplexed signal to a selected one of the input ports, thereby causing the plurality of demultiplexed wavelength channels to be output by the optical multiplexer/demultiplexer to selected ones of the plurality of subsets of output ports.

In some such embodiments, the optical switch can be configured as an optical space switch having at least one input switch port and a plurality of output switch ports. The input switch port can be configured to receive the wavelength division multiplexed optical signal and the plurality of output switch ports are configured to transmit the wavelength division multiplexed optical signal to one of the set of the input ports of the optical multiplexer/demultiplexer.

Some such embodiments of the system can further including a control module configured to control the routing of the wavelength division multiplexed signal by the optical switch to the selected one of the input ports of the optical multiplexer/demultiplexer.

Some embodiments of the apparatus include an optical power monitor configured to monitor an optical power level output from the plurality of output ports of the optical multiplexer/demultiplexer and send an electrical signal that can be proportional to the optical power level output from the each one of the output ports to the control module.

In some such embodiments, the control module can be configured to change the routing of the wavelength division multiplexed input signal to different selected ones of the input ports the optical multiplexer/demultiplexer so as to provide a highest optical power level output from the optical multiplexer/demultiplexer.

Another embodiment is a method. The method comprises inputting a wavelength division multiplexed optical signal to an input switch port of an optical switch. The method also comprises routing the wavelength division multiplexed optical signal to a selected one of a plurality of output switch ports of the optical switch. The method further comprises directing the wavelength division multiplexed optical signal from the selected one output switch port to one of a set of input ports of an optical multiplexer/demultiplexer. The method also comprises demultiplexing the wavelength division multiplexed optical signal in the optical multiplexer/demultiplexer to form a plurality of demultiplexed wavelength channels. The method further comprises transmitting each of the demultiplexed wavelength channels to selected ones of a subset of output ports within a set of output ports of the optical multiplexer/demultiplexer.

In some such embodiments, the method further includes adjusting the optical output of the optical multiplexer/demultiplexer including controlling the optical switch to sequentially route the wavelength division multiplexed optical signal to each of switch output ports to thereby locate the subset of output ports of the optical multiplexer/demultiplexer transmitting a highest the optical power level.

In some such embodiments, the controlling the optical switch can include sending one or more electrical signals from a control module to the optical switch to sequentially direct the wavelength division multiplexed optical signal from the switch input port to each of the selected ones of the output switch ports while monitoring the optical power level from the output ports of optical multiplexer/demultiplexer. In some such embodiments, the control module can be configured to send a second electrical signal to a temperature control device configured to adjust a temperature of the optical multiplexer/demultiplexer to thereby adjust optical passbands of the optical multiplexer/demultiplexer.

BRIEF DESCRIPTION OF THE DRAWINGS

Reference is now made to the following descriptions taken in conjunction with the accompanying drawings, in which:

FIG. 3A illustrates a preferred spectral response characteristic of the optical multiplexer/demultiplexer of FIG. 1, where passbands of a passband group are aligned with the wavelength channels, or grid frequencies, indicated by the index lines at top;

FIGS. 3B and 3C illustrate example of spectral response characteristics of the optical multiplexer/demultiplexer of FIG. 1, where the passbands are shifted to higher or lower wavelength from the desired response of FIG. 3A, respectively, due to, e.g. fabrication-related dimensional variations;

FIGS. 4A-4G illustrates example of spectral responses (passband groups) of the optical multiplexer/demultiplexer of FIG. 1, where each of FIGS. 4A-4G correspond to a spectral response associated with a signal input to a corresponding one of the input ports of the optical multiplexer/demultiplexer;

FIGS. 5A-5G illustrate examples in which the spectral responses of the optical multiplexer/demultiplexer of FIG. 1 are shifted due to fabrication errors, wherein an input of the optical multiplexer/demultiplexer may be chosen to align the received WDM signal channels with the effective passband spectrum of the optical multiplexer/demultiplexer; and FIGS. 6A-6G illustrate examples in which the spectral responses of the optical multiplexer/demultiplexer of FIG. 1 are shifted due to fabrication errors, wherein an input of the optical multiplexer/demultiplexer may be chosen to align the received WDM signal channels with the effective passband spectrum of the optical multiplexer/demultiplexer.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the disclosure implement general principles to reduce the effect of manufacturing variation of the optical multiplexer/demultiplexer on WDM system operability. Without limitation, for example, the embodiments of the disclosure can be implemented for an optical multiplexer/demultiplexer with a large deviation of optical passbands from nominal design values due to variation of its channel wavelengths from fabrication variation, embodiments described herein may match or nearly match the channel grid of a WDM optical signal to a desired set of output ports of the optical multiplexer/demultiplexer. In some embodiments, the matching of the WDM grid to the optical multiplexer/demultiplexer passbands may be done automatically with a suitable controller. Temperature control devices (e.g., thermo-optic tuners) may optionally be used for fine adjustment to more closely match the signal channel grid to the channel optical multiplexer/demultiplexer pass bands. Thus embodiments as described herein may significantly increase the fabrication yield of optical multiplexer/demultiplexer devices, and may reduce power consumption by reducing the degree of correction needed by temperature control devices.

Figure 1:
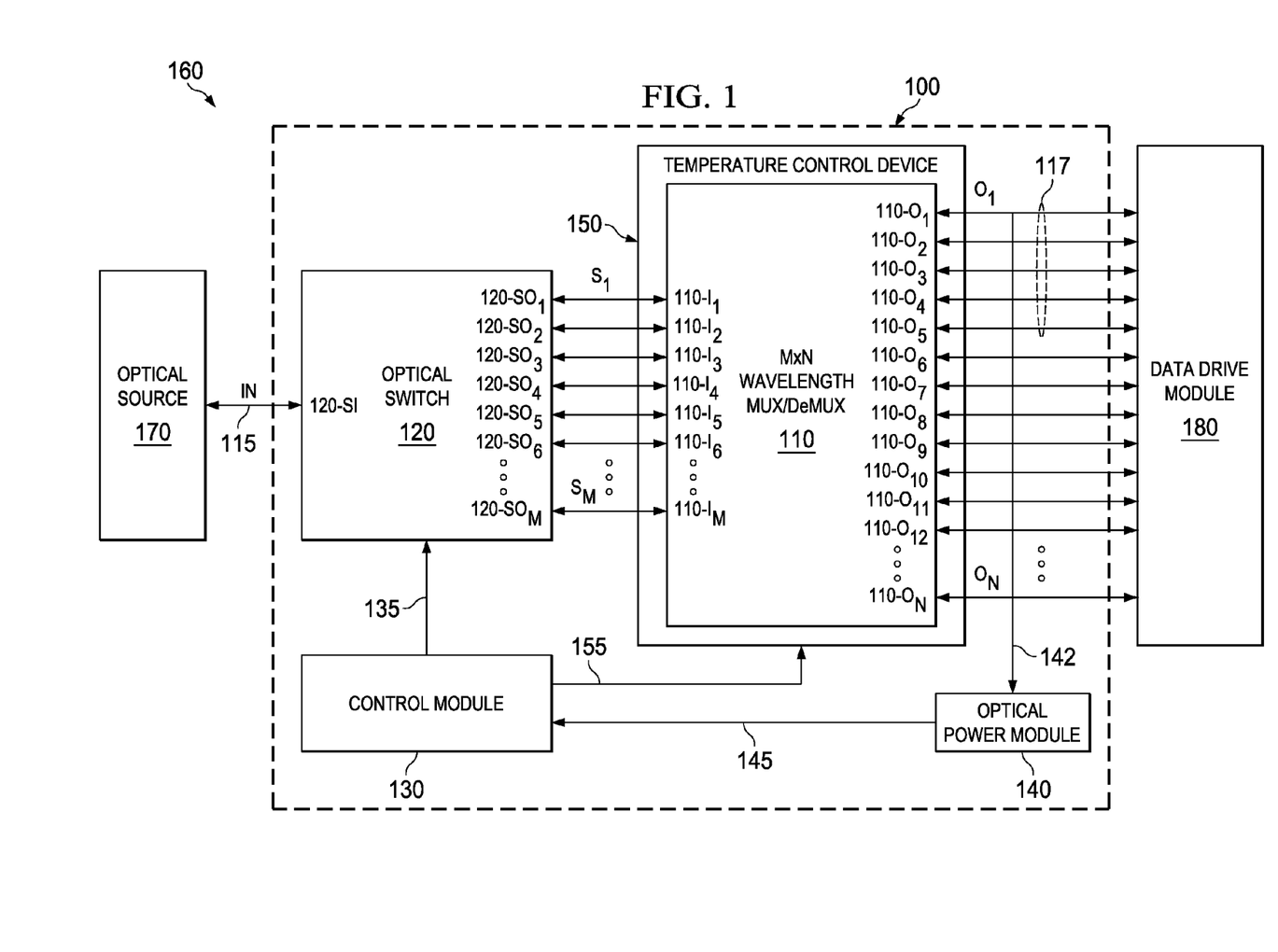
FIG. 1 illustrates a block diagram of an apparatus and a system of the disclosure.

FIG. 1 illustrates a block diagram of an apparatus 100 of the disclosure. The apparatus 100 comprises an optical multiplexer/demultiplexer 110 having a set of input ports 110-$I_1$ ... 110-$I_M$ and a set of output ports 110-$O_1$ ... 110-$O_N$, the optical multiplexer/demultiplexer 110 configured to demultiplex a wavelength division multiplexed optical signal 115 (e.g., an optical input signal in some cases) to one port (e.g., 110-$I_1$) of the set of input ports, (e.g., 110-$I_1$ ... 110-$I_M$), and to output a plurality of demultiplexed wavelength channels 117 ($O_1$ ... $O_N$) (e.g., an optical output signal in some cases) to one of a plurality of subsets of output ports (e.g., 110-$O_1$ ... 110-$O_5$), within the set of output ports 110-$O_1$ ... 110-$O_N$.

As illustrated in FIG. 1, in some embodiments, the optical multiplexer/demultiplexer 110 is configured as an M×N optical multiplexer/demultiplexer 110 with M input ports 110-$I_1$ ... 110-$I_M$ and N output ports.

The apparatus 100 also comprises an optical switch 120 configured to route the wavelength division multiplexed signal 115 to a selected one of the input ports (e.g., 110-$I_1$), thereby causing the plurality of demultiplexed wavelength channels 117 to be output by the optical multiplexer/demultiplexer 110 to selected ones of the plurality of subsets (e.g., 110-$O_1$ ... 110-$O_5$) of output ports 110-$O_1$ ... 110-$O_N$.

Upon reading the present disclosure, one skilled in the pertinent arts would understand how the apparatus 100 may be operated to demultiplex channels 117 of a received wavelength division multiplexed optical signal 115 to separate individual channels 117 of the signal 115. The apparatus 100 may also be operated to multiplex a plurality of data (e.g., demultiplexed wavelength channels) channels 117 at different wavelengths onto a single wavelength division multiplexed optical signal 115. For example, the optical multiplexer/demultiplexer 110 can be configured to multiplex the plurality of demultiplexed wavelength channels 117 to one of the plurality of subsets of output ports (e.g., 110-$O_1$ ... 110-$O_5$), within the set of output ports 110-$O_1$ ... 110-$O_N$ and to output the wavelength division multiplexed optical signal 115 to one port (e.g., 110-$I_1$) of the set of input ports, (e.g., 110-$I_1$ ... 110-$I_M$). The optical switch 120 can be configured to route the wavelength division multiplexed signal 115 from the one port (e.g., 110-$I_1$) of the set of input ports, (e.g., 110-$I_1$ ... 110-$I_M$), thereby causing the wavelength division multiplexed signal 115 to be output by a single switch port 120-SI of the optical switch 120.

The descriptions of example embodiments presented herein refer without limitation to the apparatus 100 operating as a demultiplexer. Those skilled in the pertinent art will appreciate that the principles described may be applied with similar effect and benefit when the apparatus 100 is operated as a multiplexer.

As illustrated in FIG. 1, in some embodiments, the optical switch 120 is configured as an 1×M optical switch where M equals the number of the output switch ports 120-$SO_1$ ... 120-$SO_M$ which, in turn, can equal an M number of input ports 110-$I_1$ ... 110-$I_M$ of the optical multiplexer/demultiplexer 110.

The wavelength division multiplexed optical signal 115 can include optical frequencies that can be in any wavelength band used in optical communications, e.g. in the S band (about 1460 nm to 1530 nm), the C band (about 1530 nm to 1565 nm) or the L band (about 1565 nm to 1625 nm). The frequency components (e.g., a comb of frequencies or wavelengths provided in the wavelength division multiplexed optical signal 115. The comb of frequencies can be spaced by a characteristic spacing $\Delta f$, corresponding to a regular, even spacing of the frequency components by a same frequency difference, e.g. about 100 GHz, 50 GHz, or 10 GHz.

In some embodiments of the apparatus 100 the optical switch 120 is configured as an optical space switch 120 having an input switch port 120-SI and a plurality of output switch ports 120-$SO_1$ ... 120-$SO_M$ wherein the input switch port 120-SI is configured to receive the wavelength division multiplexed optical signal 115 and the plurality of output switch ports 120-$SO_{1\ 1}$ ... 120-$SO_{Mm}$ are configured to transmit the wavelength division multiplexed optical signal 115 (e.g., $S_1$ ... $S_M$) to one (e.g., 110-$I_2$) of the set of the input ports 110-$I_1$ ... 110-$I_M$ of the optical multiplexer/demultiplexer 110.

In some embodiments, the optical switch 120 includes movable optical elements configured to controllably direct the wavelength division multiplexed optical signal 115 from the input switch port 120-SI to one of the output switch ports 120-$SO_1$ ... 120-$SO_M$. For instance, the optical switch 120, configured as an optical space switch, can include microelectromechanical system (MEMS) device having one or more mirrors that can tilt at different angles. For instance, the input signal 115 e.g., generated from a laser light source can be sent to different outputs of the switch by adjusting the tilt of the mirrors or mirrors.

In some embodiments, the optical switch 120 includes one or more Mach Zhender interferometers (MZI) devices configured to controllably direct the wavelength division multiplexed optical signal 115 from the input switch port to one of the output switch ports. For instance, adjusting optical phase differences between the path-lengths of the optical arms can be used to control which of the output switch ports 120-$SO_1$ ... 120-$SO_M$ the input signal 115 is routed to. One skilled in the pertinent arts would be familiar with other possible embodiments of the optical switch 120.

As further illustrated in FIG. 1, some embodiments of the apparatus 100 can further include a control module 130 configured to control the routing of the wavelength division multiplexed input signal 115 to the selected one of the input ports (e.g., 110-$I_2$) of the optical multiplexer/demultiplexer 110.

For instance, the control module 130 (e.g., an integrated circuit) can be configured to apply an electrical signal 135 (e.g., a voltage in some cases) to the optical switch 120 to cause a select one or more mirrors a MEMS device to tilt, or, to cause phase shift be applied to an arm of a MZI device, to thereby route the input signal 115 to the selected one input port (e.g., 110-$I_2$).

In some embodiments, the control module 130 can be configured to send one or more control signals 135 to the optical switch 120 to thereby cause the optical switch 120 to successively send the wavelength division multiplexed optical signal 115 from the input switch port 120-SI to each one of the plurality of output switch ports 120-$SO_1$ . . . 120-$SO_M$.

In some embodiments, the control module 130 is configured to adjust the routing of the wavelength division multiplexed input signal 115 to the selected one of the input ports (e.g., 110-$I_2$) that increases the optical power level output of the demultiplexed wavelength channels 117 from the optical multiplexer/demultiplexer 110. For instance, by selecting the one input port that provides the highest optical power level output (e.g., $O_1$ . . . $O_5$) from the plurality of subsets (e.g., 110-$O_1$ . . . 110-$O_5$) of output ports 110-$O_1$ . . . 110-$O_N$, the mismatch between the corresponding passbands of the optical multiplexer/demultiplexer 110 and the carrier wavelengths of the input signal 115 can be reduced.

For instance, in some embodiments, the apparatus 100 can further include an optical power monitor 140 configured to receive a portion of the demultiplexed wavelength channels 142 and to measure an optical power level from each one of the set of output ports output ports 110-$O_1$ . . . 110-$O_N$. For instance, the optical power level can be measured by the monitor 140 as the control module 130 causes the optical switch 120 to sequentially send the optical signal 115 from the input switch port to each one of the output switch ports $SO_1$ . . . 120-$SO_M$ and therefrom each of the input ports 110-$I_1$ . . . 110-$I_M$. For instance, the optical power monitor 140 can transmit one or more electrical signals 145 to the control module 130, the electrical signal 145 being proportional to the optical power level output from the each one of the output ports 110-$O_1$ . . . 110-$O_N$. The control module 130 can be configured (e.g., programmed) to adjust the routing of the demultiplexed wavelength channels 117 to the one of the output switch ports $SO_1$ . . . 120-$SO_M$ that provides the highest optical power level from a subset of the output ports 110-$O_1$ . . . 110-$O_N$ of the optical multiplexer/demultiplexer 110.

In some embodiments of the apparatus 100, the mismatch between the corresponding passbands of the optical multiplexer/demultiplexer 110 and the carrier wavelengths of the input signal 115 can be due to fabrication variations in the optical multiplexer/demultiplexer 110. In such cases, the optical switch 120 can be set (e.g., at a fabrication facility) to select the one output switch ports $SO_1$ . . . 120-$SO_M$ that minimizes this mismatch (e.g., by provides the highest optical power level at the output of the optical multiplexer/demultiplexer 110).

In other cases, the mismatch between the corresponding passbands of the optical multiplexer/demultiplexer 110 and the carrier wavelengths of the input signal 115 can alternatively, or additionally, be due to temperature variations of the optical multiplexer/demultiplexer 110 (e.g., due to different temperatures surrounding the multiplexer/demultiplexer 110). In such cases, the routing of the optical signal 115 by the optical switch 120 can be in response to temperature-induced shifts in optical passbands of the optical multiplexer/demultiplexer 110. For instance, the optical switch 120 can be configured (e.g., by the control module 130) to dynamically adjust the routing of the optical signal 115 dependent upon the present temperature variation of the optical multiplexer/demultiplexer 110.

Some embodiments of the optical multiplexer/demultiplexer 110 include a grating (e.g., arrayed waveguide gratings having high-index-contrast waveguides) configured to separate the wavelength division multiplexed optical signal 115 into the demultiplexed wavelength channels 117 (corresponding to different optical passbands of the optical multiplexer/demultiplexer 110) and send these separated wavelength channels to different subsets of the set of output ports 110-$O_1$ . . . 110-$O_N$.

Other embodiments of the optical multiplexer/demultiplexer 110 can include MZIs configured to provide the preferred optical passbands. Still other embodiments of the optical multiplexer/demultiplexer 110 would be apparent to one of ordinary skill in the pertinent arts.

Some embodiments of the optical multiplexer/demultiplexer 110 are preferably configured to have optical passbands having center-to-center frequency separations that are substantially equal to the frequency separation (e.g., spacings $\Delta f$, of 100, 50, or 10 GHz) between different wavelength channels present in the wavelength division multiplexed optical signal 115.

Some embodiments of the apparatus 100 further include a temperature control device 150 configured to change the temperature of the optical multiplexer/demultiplexer to thereby alter optical path-lengths in the optical multiplexer/demultiplexer 110. Embodiments of the temperature control device 150 can include a heater, thermoelectric cooler or combination thereof, or, other embodiments of thermo-optic tuners familiar to those skilled in the pertinent arts.

In some such embodiments, the optical switch 120 provides a coarse adjustment of the optical passbands of the multiplexer/demultiplexer and the temperature control device 150 provides a fine adjustment of the optical passbands of the multiplexer/demultiplexer. In some embodiments, the temperature control device 150 can be controlled by the control module 130 which can be configured to send an electrical signal 155 to the temperature control device 150 to cause the device to heat or cool the optical multiplexer/demultiplexer so as to fine tune the centers of the optical passbands of the selected one subset of output ports (e.g., 110-$O_1$ . . . 110-$O_5$), within the set of output ports 110-$O_1$ . . . 110-$O_N$.

To facilitate separation of the wavelength channels over a broad range of wavelengths, the optical multiplexer/demultiplexer 110 can preferably be configured such that each combination of input port 110-$I_1$ . . . 110-$I_M$ to output port 110-$O_1$ . . . 110-$O_N$ have distinct path lengths that provide different optical passbands centered at different wavelengths. Such embodiments can thereby provide a maximal tunable wavelength range ($\pm\lambda$max) of optical passbands to accommodate the anticipated ranges misalignment in the optical passbands of the multiplexer/demultiplexer 110 as compared to the wavelength channels present in the input optical signal 115.

For instance, in some embodiments, the optical switch 120 is configured to have a number M of output switch ports equal to the number M of the optical multiplexer/demultiplexer 110 input ports. In some cases the number M of input ports preferably is equal to or greater than $(2\times(\lambda max/\delta\lambda))+1$ where $\delta\lambda \leq 2\lambda t$. Here $\lambda t$ is defined as a maximum tunable wavelength range attainable by the temperature control device 150 coupled to the multiplexer/demultiplexer 110, $\pm\lambda$max is defined as the maximum tunable wavelength range and $\delta\lambda$ is defined as the center-to-center difference of the nearest neighbor of the optical passbands optical multiplexer/demultiplexer 110.

As a non-limiting example, assume a fabrication-caused wavelength shift from the preferred value is within the range of $\pm\lambda_m$, which is too large for compensation using thermal tuning. And assume further that the optical multiplexer/demultiplexer 110 thermal tuning has a maximum wavelength adjustment range of $\pm\lambda_t$ that is much smaller than $\pm\lambda_m$. In such a case an embodiment of the M×N optical multiplexer/demultiplexer 110 may be configured with a wavelength step size of $\delta\lambda \leq 2\lambda_t$ between different neighboring input ports, and the number of ports should be $\geq 2(\lambda_m/\delta\lambda)+1$.

Another embodiment of the disclosure is a system, e.g., an optical communication system. FIG. 1 also presents a block diagram of the apparatus 100 configured as a system 160. The system 160 can be or include any embodiments of the apparatus 100 discussed herein. In some cases, the system 160 can be configured as an input or output planar photonic integrated circuit.

Referring to FIG. 1, the system 160 comprises a tunable optical multiplexer/demultiplexer apparatus 100. The apparatus 100 includes the optical multiplexer/demultiplexer 110 the optical switch 120, such as any of the embodiments described above.

In some cases, the optical multiplexer/demultiplexer 110 demultiplexes the wavelength division multiplexed optical signal 115 provided by an optical source 170 (e.g., a laser) to the optical switch 120. The optical switch 120 can route the wavelength division multiplexed signal 115 to the selected one of the input ports (e.g., 110-$I_1$), thereby causing the plurality of demultiplexed wavelength channels 117 to be output by the optical multiplexer/demultiplexer 110 to a subset (e.g., 110-$O_1$ . . . 110-$O_5$) of the plurality of output ports 110-$O_1$ . . . 110-$O_N$.

In some cases, the demultiplexed wavelength channels 117 in the subset of output ports 110-$O_1$ . . . 110-$O_5$ is transmitted to a data drive module 180 of the system 160. The data drive module 180 can be configured to encode data into the carrier wavelengths (e.g., binary data) using procedures well known to those skilled in the pertinent arts (binary phase shift keying or on-off keying, quadrature phase-shift keying, or similar keying protocols).

In some embodiments of the system 160, the optical switch 120 can be configured as an optical space switch having at least one input switch port 120-SI and a plurality of output switch ports 120-$SO_1$ . . . 120-$SO_M$. The input switch port 120-SI is configured to receive the wavelength division multiplexed optical signal 115 and the plurality of output switch ports 120-$SO_1$ . . . 120-$SO_M$ are configured to transmit the wavelength division multiplexed optical signal 115 to one of the set of the input ports 110-$I_1$ . . . 110-$I_M$ of the optical multiplexer/demultiplexer 110.

Some embodiments of the system 160 further include a control module 130 configured to control the routing of the wavelength division multiplexed signal 115 by the optical switch 120 to the selected one of the input ports 110-$I_1$ . . . 110-$I_M$ of the optical multiplexer/demultiplexer 110.

Some embodiments of the system 160 further include an optical power monitor 140 configured to monitor an optical power level output from the plurality of output ports 110-$O_1$ . . . 110-$O_N$ of the optical multiplexer/demultiplexer 110 and send an electrical signal 145 that is proportional to the optical power level output from the each one of the output ports 110-$O_1$ . . . 110-$O_N$ to the control module 130. For instance, the control module 130 can be configured (e.g., based on feedback from the electrical signal 145) to change the routing of the wavelength division multiplexed input signal 115 to different selected ones of the input ports 110-$I_1$ . . . 110-$I_M$ of the optical multiplexer/demultiplexer 110 so as to provide a highest the optical power level output (e.g., in the demultiplexed wavelength channels 117) from the optical multiplexer/demultiplexer 110.

Some embodiments of the system 160 further include a temperature control device 150 configured to change the temperature of the optical multiplexer/demultiplexer 110 to thereby alter optical path-lengths in the optical multiplexer/demultiplexer 110 and thereby provide a finer adjustment of the optical passbands of the multiplexer/demultiplexer as compared to that provided by routing input ports 110-$I_1$ . . . 110-$I_M$ of the optical multiplexer/demultiplexer 110 via the optical switch 120.

Figure 2:
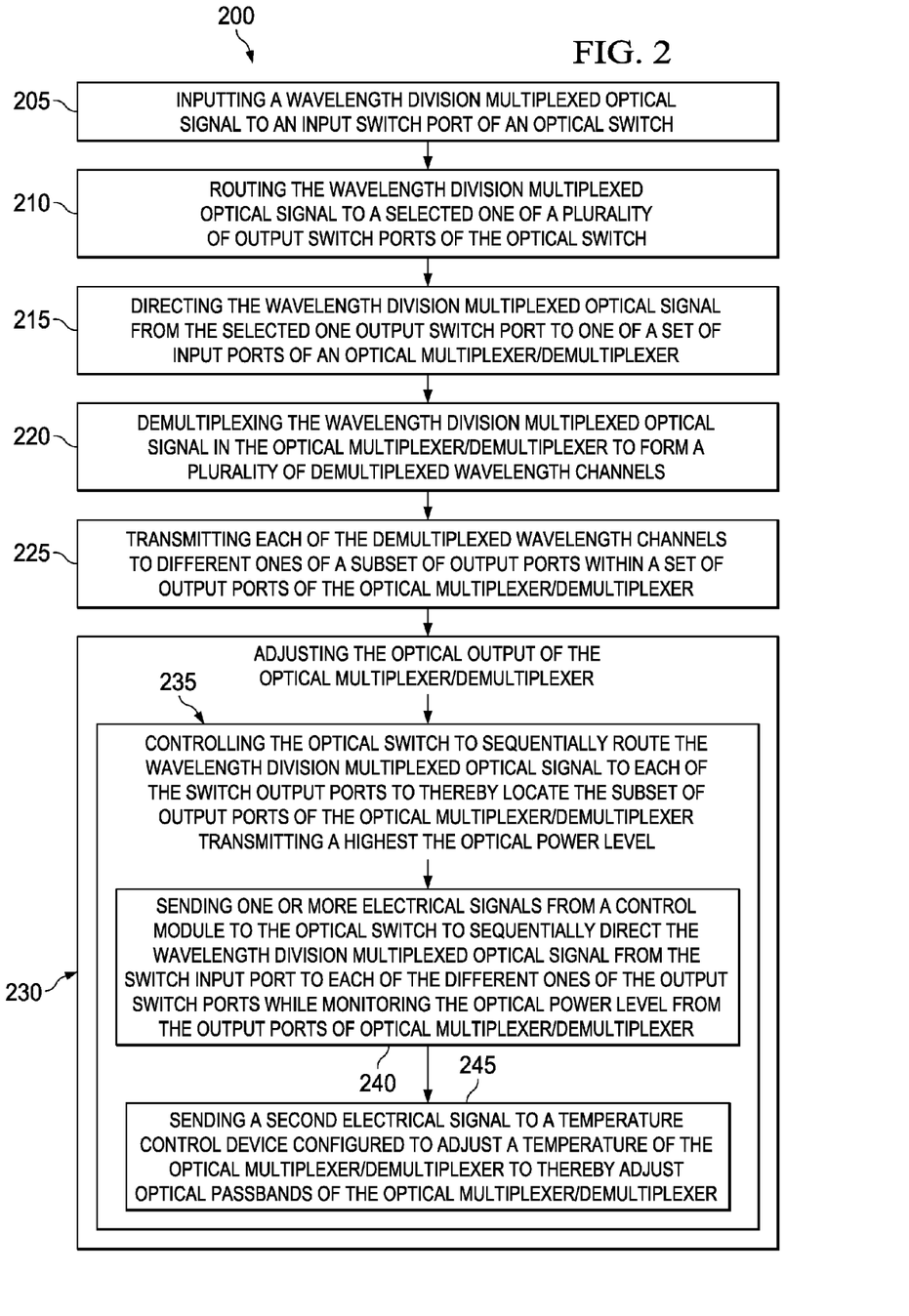
FIG. 2 presents a flow diagram of a method of the disclosure, such as a method implemented using any of the apparatuses or systems discussed in the context of FIG. 1.

Another embodiment is a method 200. FIG. 2 presents a flow diagram of a method of the disclosure, such as a method implemented using any of the apparatuses 100 or systems 160 discussed in the context of FIG. 1. In some cases, the method 200 can be applied to reduce misalignment between frequency channels 117 of a wavelength-division multiplexed optical signal 115 and the optical passbands for selected output ports 110-$O_1$ . . . 110-$O_N$ of the optical multiplexer/demultiplexer 110.

With continuing reference to FIGS. 1 and 2 throughout the method 200 comprises a step 205 of inputting a wavelength division multiplexed optical signal 115 to an input switch port 120-SI of an optical switch 120. The method comprises a step 210 of routing the wavelength division multiplexed optical signal 115 to a selected one of a plurality of output switch ports 120-$SO_1$ . . . 120-$SO_M$ of the optical switch 120. The method 200 also comprises a step 215 of directing the wavelength division multiplexed optical signal 115 from the selected one output switch port (e.g., one of 120-$SO_1$ . . . 120-$SO_M$) to one of a set of input ports (110-$I_1$ . . . 110-$I_M$) of an optical multiplexer/demultiplexer 110. The method 200 further comprises a step 220 of demultiplexing the wavelength division multiplexed optical signal 115 in the optical multiplexer/demultiplexer 110 to form a plurality of demultiplexed wavelength channels 117. The method also comprises a step 225 of transmitting each of the demultiplexed wavelength channels 117 to selected ones of a subset of output ports (e.g., 110-$O_1$ . . . 110-$O_5$) within a set of output ports 110-$O_1$ . . . 110-$O_N$ of the optical multiplexer/demultiplexer 110.

Some embodiments of the method 200 further include a step 230 of adjusting the optical output ($O_1$ . . . $O_N$) of the optical multiplexer/demultiplexer 110 including a step 235 of controlling the optical switch 120 (e.g., via the control module 130) to sequentially route the wavelength division multiplexed optical signal 115 to each of the switch output ports 120-$SO_1$ . . . 120-$SO_M$ to thereby locate the subset of output ports (e.g., 110-$O_1$ . . . 110-$O_5$) of the optical multiplexer/demultiplexer 110 transmitting a highest the optical power level.

In some embodiments of the method 200, controlling the optical switch (step 235) includes a step 240 of sending one or more electrical signals 135 from a control module 130 to the optical switch 120 to sequentially direct the wavelength division multiplexed optical signal 115 from the switch input port 110-SI to each of the selected ones of the output switch ports 120-$SO_1$ . . . 120-$SO_M$ while monitoring the optical power level from the output ports 110-$O_1$ . . . 110-$O_N$ of optical multiplexer/demultiplexer 110 (e.g., via the optical power level monitor 140).

In some embodiments of the method 200, the control module 130 in configured, in step 245, to send a second electrical signal 155 to a temperature control device 150 configured to adjust a temperature of the optical multiplexer/demultiplexer 110 to thereby adjust optical passbands of the optical multiplexer/demultiplexer 110.

Further aspects of some embodiments of the apparatus 100, system 160 or method 200 are illustrated in the figures and disclosure to follow.

Referring to FIG. 1, some embodiments of the optical multiplexer/demultiplexer 110 may be, e.g. a conventional optical multiplexer/demultiplexer. Some embodiments of the optical multiplexer/demultiplexer 110 may include optical paths, e.g. waveguides, and heaters coupled to some optical paths to adjust one or more optical path lengths within the optical multiplexer/demultiplexer 110 to tune the operation of the device. Some embodiments of the optical multiplexer/demultiplexer 110 includes M inputs designated $110\text{-}I_1 \ldots 110\text{-}I_M$, and N outputs designated $110\text{-}O_1 \ldots 110\text{-}O_N$. Some embodiments of the optical multiplexer/demultiplexer 110 separates wavelength channels 117 of a WDM signal 115 (IN) presented to one of the inputs $110\text{-}I1 \ldots 110\text{-}I_M$, producing multiple output signals ($O_1 \ldots O_N$) corresponding to at least some of the WDM channels. As described further below, the separated channels 117 are output to selected ones of the outputs $110\text{-}O_1 \ldots 110\text{-}O_N$ depending on which input (e.g., $110\text{-}I_2$) receives the WDM signal.

Some embodiments of the optical switch 120 may be a conventional switch, e.g., an optical space switch. Those skilled in the pertinent art are familiar with such devices and their fabrication. Some embodiments of the switch 120 includes one input 120-SI and M outputs $120\text{-}SO_1 \ldots 120\text{-}SO_M$. Some embodiments of the controller 130 are coupled to the switch 120 to control the signal path between the input $120\text{-}I_1 \ldots 120\text{-}I_M$ and a selected one of the outputs $120\text{-}SO_1 \ldots 120\text{-}SO_M$. Signal paths $S_1 \ldots S_M$ correspond to the outputs $120\text{-}SO_1 \ldots 120\text{-}SO_M$ and the inputs 120-SI, and may be referred to below to describe the signals output by the switch 120 and input by the optical multiplexer/demultiplexer 110.

Figures 3A, 3C:
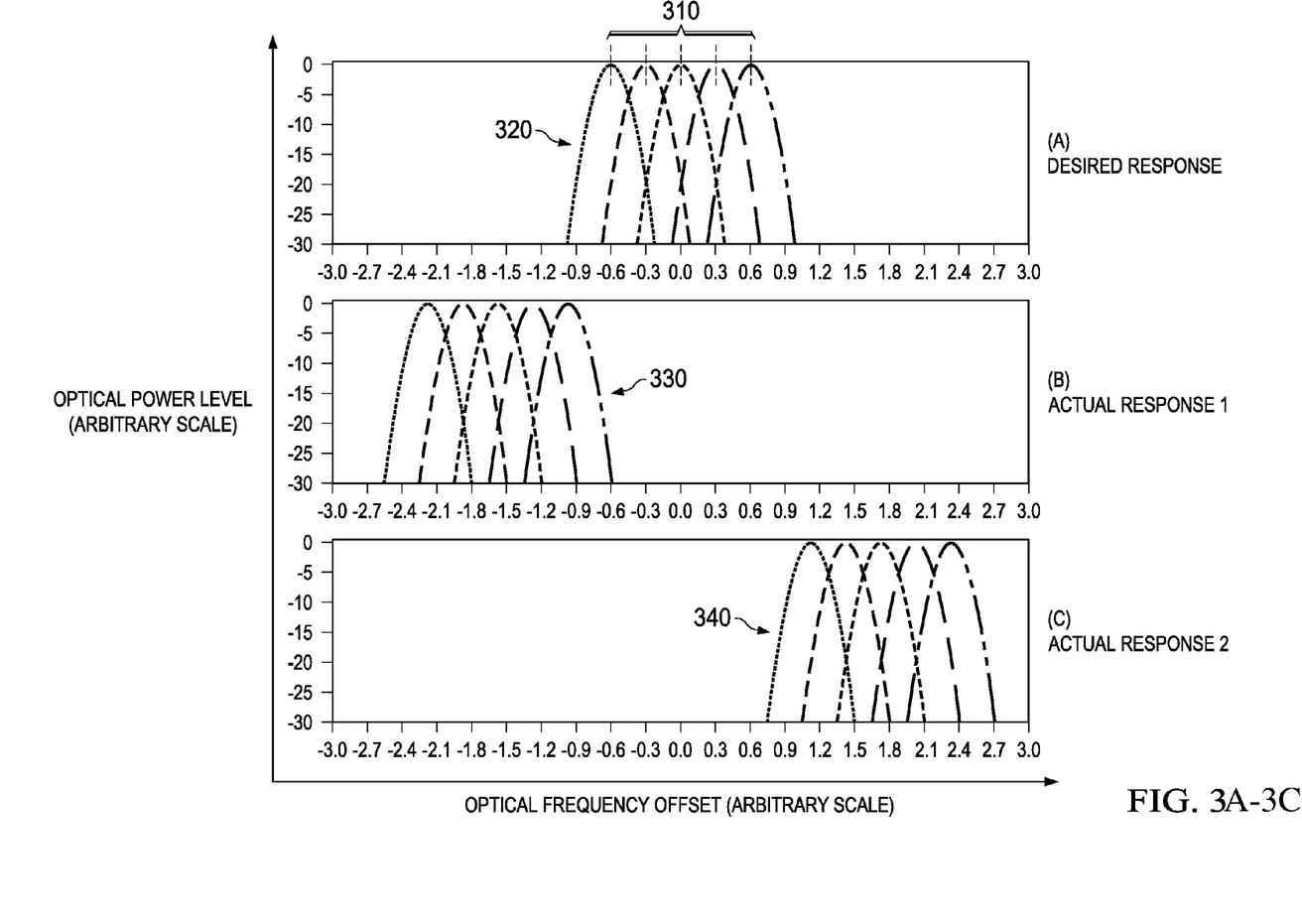
Figure 4A:
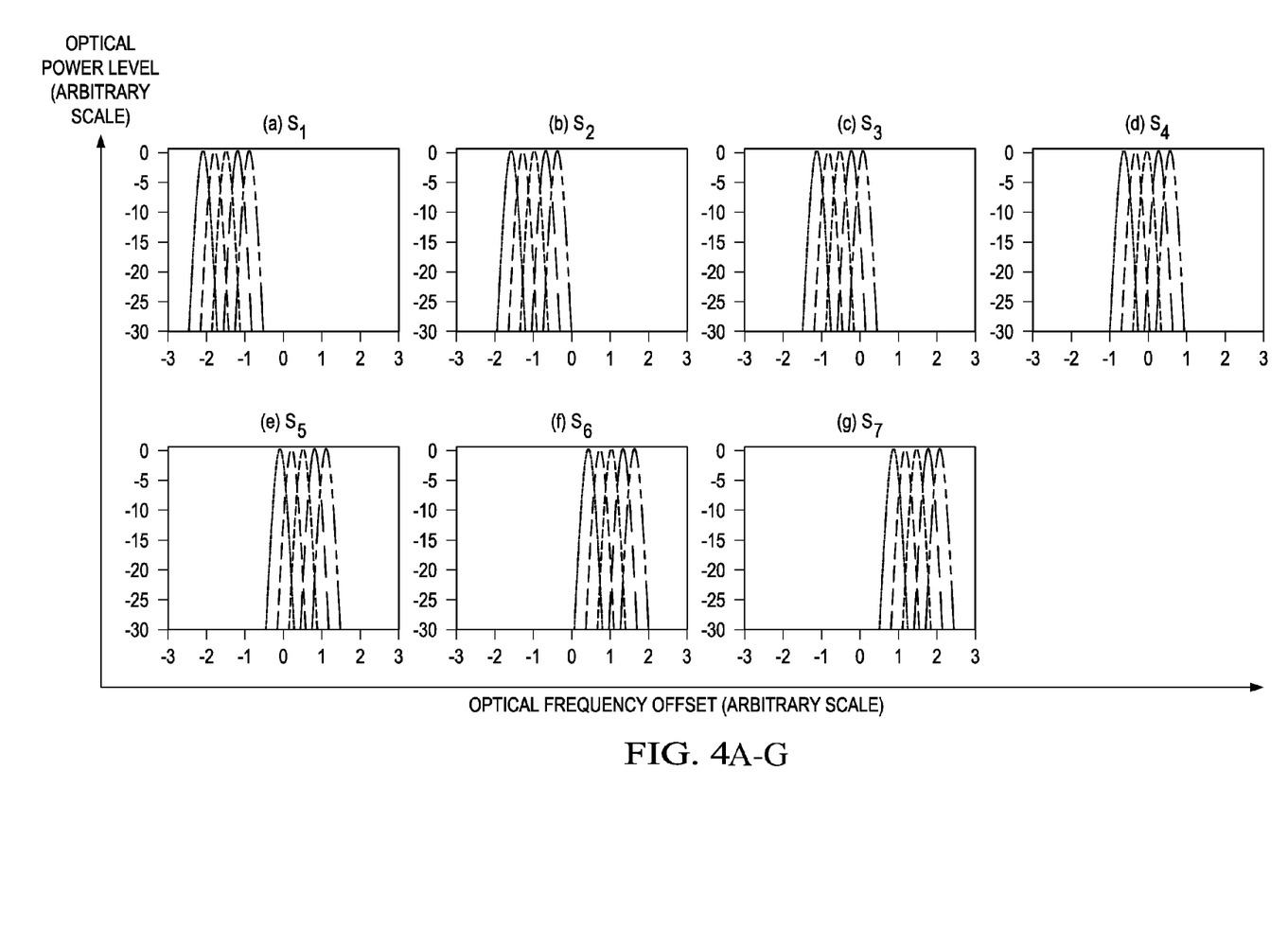

FIGS. 3A-3C illustrate various aspects of the wavelength accuracy problem of wavelength optical multiplexer/demultiplexers.

FIG. 3A illustrates without limitation a representative spectral response of an example embodiment of the optical multiplexer/demultiplexer 110. Wavelength channels 117 of a WDM optical signal 115, sometimes referred to as the WDM grid, or simply "grid", are marked by vertical lines 310 at 0, ±0.3 and ±0.6 (arbitrary scale). Passbands 320 in a passband group, or spectrum, are shown being about aligned with the wavelength channels 310. Each of the wavelength channels 117 of the grid 310 may correspond to a particular output of the optical multiplexer/demultiplexer 110. For example, if N=15, the wavelength channels may be output to $110\text{-}O_6 \ldots 110\text{-}O_{10}$. A downstream optical circuit (e.g., a data drive module 180) may be configured to expect the wavelength channels to be output to these particular outputs of the optical multiplexer/demultiplexer 110.

FIGS. 3B and 3C illustrate spectral response of the example optical multiplexer/demultiplexer 110 wherein passbands 330 (FIG. 3B) and passbands 340 (FIG. 3C) are shifted from the desired case represented by FIG. 3A. For example, passbands 330 in FIG. 3B are shifted to lower wavelengths from the ideal case, while in FIG. 3C passbands 340 are shifted to higher wavelengths. These cases represent, for example, the effect of a large fabrication-induced shift in the peak wavelengths of the passband positions. This shift has the effect of moving the WDM channels to different outputs of the optical multiplexer/demultiplexer 110. Thus, a connected optical circuit may not receive the correct signal, or may not receive any signal at all.

FIGS. 4A-4G illustrate spectra of the optical multiplexer/demultiplexer 110 (FIG. 1) according to one embodiment. The spectra represent without limitation passband locations for an embodiment in which M=7. The M signals between the optical switch 120 and the optical multiplexer/demultiplexer 110 are designated $S_1 \ldots S_7$. As the signal path to which the WDM signal is switched progresses from $S_1$ to $S_7$, the passbands shift to higher wavelength by a regular amount as determined by, e.g. the geometric parameters of the optical multiplexer/demultiplexer 110. As an example, the spectrum corresponding to $S_4$ (FIG. 4D), could correspond to, e.g., optical input to a port (e.g., $110\text{-}I_4$) at about the center of the optical multiplexer/demultiplexer 110, that is centered about at zero wavelength shift. As the WDM signal 115 is switched to progressively lower signal paths, e.g. $S_3\text{-}S_2\text{-}S_1$, the center wavelength of the passband group shifts to greater negative wavelength offsets. As the WDM signal 115 is switched to higher signal paths, e.g. $S_5\text{-}S_6\text{-}S_7$, the center wavelength of the passband group shifts to greater positive wavelength offset.

Figure 5A:
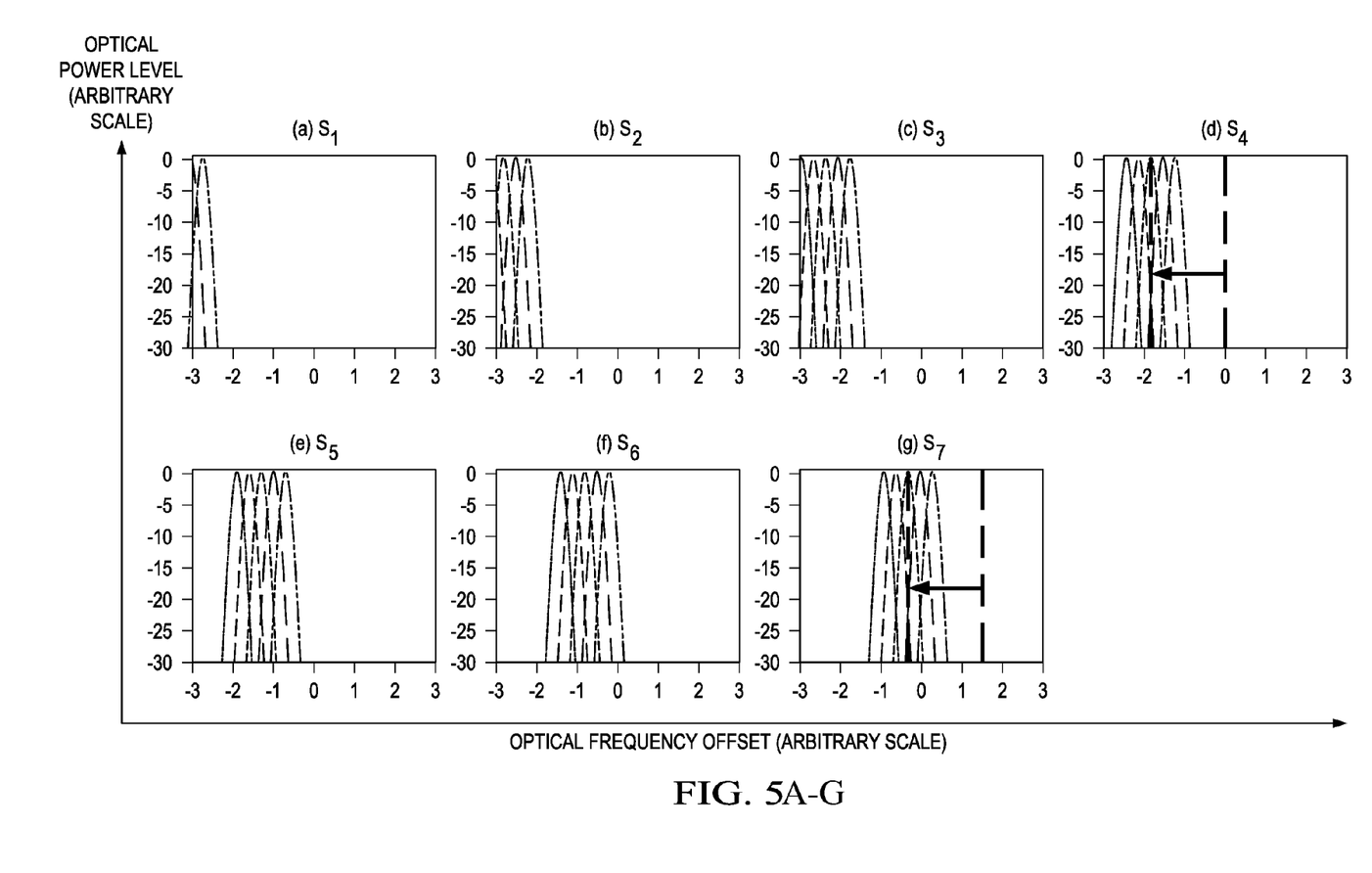
Figure 6A:
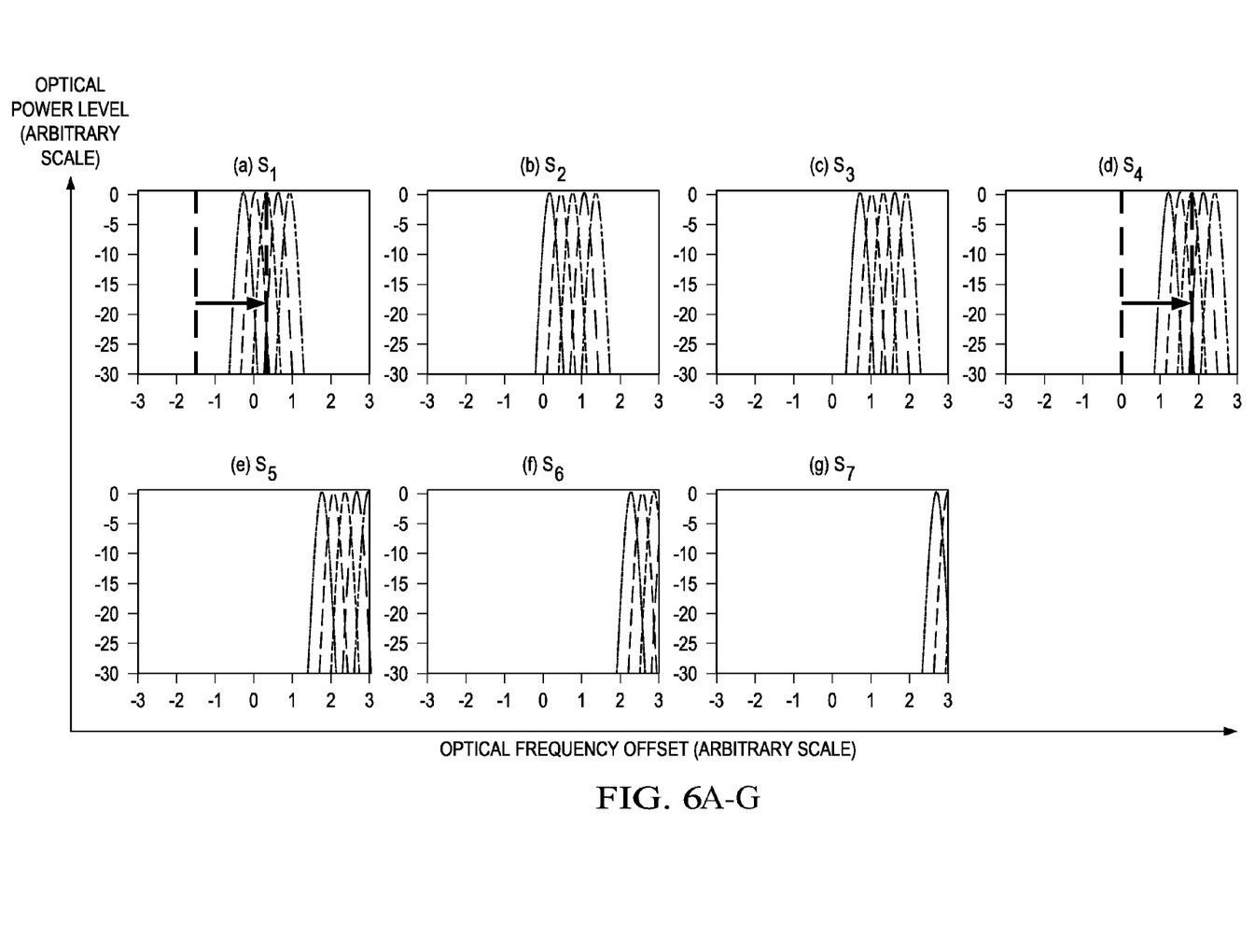

Considering now FIGS. 5A-5G, examples are shown, without limitation, of cases in which there is a large fabrication-induced shift in the spectra positions. More specifically, FIG. 5D illustrates a case in which a fabrication-induced wavelength shift causes the spectral response of the optical multiplexer/demultiplexer 110 to shift to lower wavelengths, e.g., a center wavelength offset of about −1.7 (arbitrary frequency scale). Because of this shift, the WDM channels 117 are not output to the correct output of the optical multiplexer/demultiplexer 110. However, considering FIG. 5G, the passbands associated with the port $S_7$ are shifted down in wavelength such that the center wavelength is near zero, e.g. about −0.2 (arbitrary frequency scale). Thus when the received signal is input to the port $110\text{-}I_7$ (e.g., via $S_7$), the WDM channels 117 are routed to the same outputs of the optical multiplexer/demultiplexer 110 as was previously the case as described for FIG. 3A. Any relatively small remaining wavelength shift may be corrected thermo-optically (e.g., via a temperature control device 150) to center the passbands of the optical multiplexer/demultiplexer 110 at about 0 wavelength offset. Thus, the WDM channels are correctly routed to following optical processing circuitry in spite of the fabrication-related geometry errors.

Similarly, FIGS. 6A-6G illustrate the passbands of the optical multiplexer/demultiplexer 110 for the case that the passbands are significantly shifted to greater wavelength, e.g. by about 1.7 (arbitrary frequency scale), e.g. due to fabrication variations in the optical multiplexer/demultiplexer 110. In this case, when the received WDM signal 115 is input to the port $110\text{-}I_1$ (via $S_1$) the WDM channels 117 are properly routed to the expected outputs. Thus, the switch output port $120\text{-}SO_1$ may be used, optionally with additional thermo-optic tuning to more accurately position the passbands.

In some WDM applications, especially the case of dense WDM (DWDM) with very narrow channel spacing, the optical multiplexer/demultiplexer 110 sometimes requires either a thermal design or temperature stabilization, e.g., with temperature control device 150 that includes a thermoelectric cooler, to maintain the optical multiplexer/demultiplexer 110 temperature at certain level. Such implementations can consume significant power when the optical multiplexer/demultiplexer 110 is large and/or the temperature variation is large.

Embodiments of the disclosed apparatus 100 may eliminate the need for the thermoelectric cooler, and use the small-range integrated tuning of the optical multiplexer/demultiplexer 110 (e.g. thermo-optic tuning) and the large-range stepping provided by the optical switch 120 to compensate for the temperature variations.

In a nonlimiting example, if the wavelength shift of the passband group caused by switching the WDM optical signal 115 between neighboring inputs ports 110-I is equivalent to the shift caused by an environment temperature change of 10° C., when the environment temperature changes by 10° C., the WDM signal may be shifted to the next input port of the optical multiplexer/demultiplexer 110 to use the passband group centered at zero delta wavelength. In the case of a 20° C. change of environment temperature, the optical signal 215 to the optical multiplexer/demultiplexer 110 may be shifted by two ports. In the case of a 25° C. change of environment temperature, the WDM optical signal 215 may be shifted by, e.g., two input ports to compensate for 20° C., and then integrated thermal tuning (e.g. a temperature control device 150) of the optical multiplexer/demultiplexer 110 may be used to compensate for, e.g., the remaining 5° C. In this manner, the maximum tuning done by thermo-optic adjustment may be significantly reduced, e.g. to 5° C. In other words, the temperature variations that may be accommodated can be much larger, with a smaller amount of power consumption by thermo-optic tuning heaters.

Those skilled in the art to which this application relates will appreciate that other and further additions, deletions, substitutions and modifications may be made to the described embodiments.

What is claimed is:

1. An apparatus, comprising:
an optical multiplexer/demultiplexer having a set of input ports and a set of output ports, the optical multiplexer/demultiplexer configured to demultiplex a wavelength division multiplexed optical signal to one port of the set of input ports, and to output a plurality of demultiplexed wavelength channels to one of a plurality of subsets of output ports within the set of output ports;
an optical switch configured to route the wavelength division multiplexed signal to a selected one of the input ports, thereby causing the plurality of demultiplexed wavelength channels to be output by the optical multiplexer/demultiplexer to selected ones of the plurality of subsets of output ports; and
a control module configured to control the routing of the wavelength division multiplexed input signal to the selected one of the input ports of the optical multiplexer/demultiplexer, wherein the control module is configured to send one or more control signals to the optical switch to thereby cause the optical switch to successively send the wavelength division multiplexed optical signal from the input switch port to each one of the plurality of output switch ports.

2. The apparatus of claim 1, wherein the optical switch is configured as an optical space switch having an input switch port and a plurality of output switch ports, wherein the input switch port is configured to receive the wavelength division multiplexed optical signal and the plurality of output switch ports are configured to transmit the wavelength division multiplexed optical signal to one of the set of the input ports of the optical multiplexer/demultiplexer.

3. The apparatus of claim 1, wherein the optical switch includes movable optical elements configured to controllably direct the wavelength division multiplexed optical signal from the input switch port to one of the output switch ports.

4. The apparatus of claim 1, wherein the optical switch includes one or more Mach Zhender interferometers configured to controllably direct the wavelength division multiplexed optical signal from the input switch port to one of the output switch ports.

5. The apparatus of claim 1, further including a temperature control device configured to change the temperature of the optical multiplexer/demultiplexer to thereby alter optical path-lengths in the optical multiplexer/demultiplexer, wherein the optical switch is configured to provide a coarse adjustment of the optical passbands of the multiplexer/demultiplexer and the temperature control device is configured to provide a fine adjustment of the optical passbands of the multiplexer/demultiplexer.

6. The apparatus of claim 1, wherein the control module is configured to adjust the routing of the wavelength division multiplexed signal to the selected one of the input ports that increases the optical power level output of the demultiplexed wavelength channels from the optical multiplexer/demultiplexer.

7. The apparatus of claim 6, wherein the control module is configured to route the wavelength division multiplexed signal in response to temperature-induced shifts in optical passbands of the optical multiplexer/demultiplexer.

8. The apparatus of claim 1, wherein the optical multiplexer/demultiplexer includes a grating configured to separate the wavelength division multiplexed optical signal into separated wavelength channels and send the separated wavelength channels to selected ones of the set of output ports.

9. The apparatus of claim 1, wherein the optical multiplexer/demultiplexer is configured to multiplex the plurality of demultiplexed wavelength channels to one of the plurality of subsets of output ports within the set of output ports and to output the wavelength division multiplexed optical signal to one port of the set of input ports; and
the optical switch is configured to route the wavelength division multiplexed signal from the one port of the set input ports of the optical multiplexer/demultiplexer, thereby causing the wavelength division multiplexed signal to be output by a single switch port of the optical switch.

10. An apparatus, comprising:
an optical multiplexer/demultiplexer having a set of input ports and a set of output ports, the optical multiplexer/demultiplexer configured to demultiplex a wavelength division multiplexed optical signal to one port of the set of input ports, and to output a plurality of demultiplexed wavelength channels to one of a plurality of subsets of output ports within the set of output ports;
an optical switch configured to route the wavelength division multiplexed signal to a selected one of the input ports, thereby causing the plurality of demultiplexed wavelength channels to be output by the optical multiplexer/demultiplexer to selected ones of the plurality of subsets of output ports;
a control module configured to control the routing of the wavelength division multiplexed input signal to the selected one of the input ports of the optical multiplexer/demultiplexer; and
an optical power monitor configured to monitor an optical power level output from the plurality of output ports of the optical multiplexer/demultiplexer and send an electrical signal that is proportional to the optical power level output from the each one of the output ports to the control module.

11. An apparatus, comprising:
an optical multiplexer/demultiplexer having a set of input ports and a set of output ports, the optical multiplexer/demultiplexer configured to demultiplex a wavelength division multiplexed optical signal to one port of the set of input ports, and to output a plurality of demultiplexed wavelength channels to one of a plurality of subsets of output ports within the set of output ports;

an optical switch configured to route the wavelength division multiplexed signal to a selected one of the input ports, thereby causing the plurality of demultiplexed wavelength channels to be output by the optical multiplexer/demultiplexer to selected ones of the plurality of subsets of output ports; and a temperature control device configured to change the temperature of the optical multiplexer/demultiplexer to thereby alter optical path-lengths in the optical multiplexer/demultiplexer, wherein the optical switch is configured to provide a coarse adjustment of the optical passbands of the multiplexer/demultiplexer and the temperature control device is configured to provide a fine adjustment of the optical passbands of the multiplexer/demultiplexer.

12. A system, comprising:

a tunable optical multiplexer/demultiplexer apparatus including:

an optical multiplexer/demultiplexer having a set of input ports and a set of output ports, the optical multiplexer/demultiplexer configured to demultiplex a wavelength division multiplexed optical signal to one port of the set of input ports, and to output a plurality of demultiplexed wavelength channels to one of a plurality of subsets of output ports within the set of output ports;

an optical switch configured to route the wavelength division multiplexed signal to a selected one of the input ports, thereby causing the plurality of demultiplexed wavelength channels to be output by the optical multiplexer/demultiplexer to selected ones of the plurality of subsets of output ports;

a control module configured to control the routing of the wavelength division multiplexed input signal to the selected one of the input ports of the optical multiplexer/demultiplexer; and an optical power monitor configured to monitor an optical power level output from the plurality of output ports of the optical multiplexer/demultiplexer and send an electrical signal that is proportional to the optical power level output from the each one of the output ports to the control module.

13. The system of claim 12, wherein the optical switch is configured as an optical space switch having at least one input switch port and a plurality of output switch ports, wherein the input switch port is configured to receive the wavelength division multiplexed optical signal and the plurality of output switch ports are configured to transmit the wavelength division multiplexed optical signal to one of the set of the input ports of the optical multiplexer/demultiplexer.

14. The system of claim 12, wherein the control module is configured to send one or more control signals to the optical switch to thereby cause the optical switch to successively send the wavelength division multiplexed optical signal from the input switch port to each one of the plurality of output switch ports.

15. The system of claim 12, further including a temperature control device configured to change the temperature of the optical multiplexer/demultiplexer to thereby alter optical path-lengths in the optical multiplexer/demultiplexer, wherein the optical switch is configured to provide a coarse adjustment of the optical passbands of the multiplexer/demultiplexer and the temperature control device is configured to provide a fine adjustment of the optical passbands of the multiplexer/demultiplexer.

16. The system of claim 12, wherein the control module is configured to change the routing of the wavelength division multiplexed input signal to different selected ones of the input ports the optical multiplexer/demultiplexer so as to provide a highest optical power level output from the optical multiplexer/demultiplexer.

17. A method, comprising:

inputting a wavelength division multiplexed optical signal to an input switch port of an optical switch;

routing the wavelength division multiplexed optical signal to a selected one of a plurality of output switch ports of the optical switch;

directing the wavelength division multiplexed optical signal from the selected one output switch port to one of a set of input ports of an optical multiplexer/demultiplexer;

demultiplexing the wavelength division multiplexed optical signal in the optical multiplexer/demultiplexer to form a plurality of demultiplexed wavelength channels;

transmitting each of the demultiplexed wavelength channels to selected ones of a subset of output ports within a set of output ports of the optical multiplexer/demultiplexer; and adjusting the optical output of the optical multiplexer/demultiplexer, including controlling the optical switch to sequentially route the wavelength division multiplexed optical signal to each of switch output ports to thereby locate the subset of output ports of the optical multiplexer/demultiplexer transmitting a highest optical power level.

18. The method of claim 17, wherein the controlling the optical switch includes sending one or more electrical signals from a control module to the optical switch to sequentially direct the wavelength division multiplexed optical signal from the switch input port to each of the selected ones of the output switch ports while monitoring the optical power level from the output ports of optical multiplexer/demultiplexer.

19. The method of claim 18, wherein the control module is configured to send a second electrical signal to a temperature control device configured to adjust a temperature of the optical multiplexer/demultiplexer to thereby adjust optical passbands of the optical multiplexer/demultiplexer.

* * * * *